United States Patent
Kim et al.

(10) Patent No.: US 9,656,654 B2
(45) Date of Patent: May 23, 2017

(54) POWER TRANSMISSION SYSTEM OF HYBRID ELECTRIC VEHICLE

(71) Applicant: Hyundai Motor Company, Seoul (KR)

(72) Inventors: Kyungha Kim, Whasung-Si (KR); Yeonho Kim, Whasung-Si (KR); Ki Nam Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 124 days.

(21) Appl. No.: 14/339,251

(22) Filed: Jul. 23, 2014

(65) Prior Publication Data

US 2015/0119194 A1    Apr. 30, 2015

(30) Foreign Application Priority Data

Oct. 28, 2013 (KR) .................. 10-2013-0128660

(51) Int. Cl.
- *B60K 6/365* (2007.10)
- *B60W 10/02* (2006.01)
- *B60K 6/36* (2007.10)
- *B60K 6/442* (2007.10)

(52) U.S. Cl.
CPC .............. *B60W 10/02* (2013.01); *B60K 6/36* (2013.01); *B60K 6/442* (2013.01); *Y02T 10/6234* (2013.01); *Y10S 903/902* (2013.01); *Y10T 477/26* (2015.01); *Y10T 477/27* (2015.01)

(58) Field of Classification Search
CPC .................................................... B60K 6/365
See application file for complete search history.

(56) References Cited

U.S. PATENT DOCUMENTS

| 2010/0018789 A1* | 1/2010 | Oba ...................... B60K 6/365 180/65.235 |
| 2010/0041502 A1* | 2/2010 | Nagamatsu ............ B60K 6/365 475/5 |
| 2013/0260936 A1* | 10/2013 | Takei ..................... B60K 6/365 475/5 |

FOREIGN PATENT DOCUMENTS

| EP | 2 058 160 A1 | 5/2009 |
| JP | 4102423 B2 | 3/2008 |
| KR | 10-1283046 B1 | 7/2013 |

* cited by examiner

*Primary Examiner* — Tisha Lewis
(74) *Attorney, Agent, or Firm* — Morgan Lewis & Bockius LLP

(57) ABSTRACT

A power transmission system of a hybrid electric vehicle may include a first input device, a torque transmitting device, a second input device, an output device, and a final reduction device. The first input device may receive either or both of torques of an engine and a first motor/generator. The torque transmitting device may be disposed at a rear or downstream of the first input device and selectively receive torque from the first input device. The second input device may be disposed at a rear or downstream of the torque transmitting device, convert torque of a second motor/generator, and output the converted torque. The output device may receive torque from the torque transmitting device and/or the second input device and output the torque. The final reduction device may output the torque transmitted from the output device as driving torque.

15 Claims, 4 Drawing Sheets

POWER TRANSMISSION SYSTEM OF HYBRID ELECTRIC VEHICLE

CROSS-REFERENCE TO RELATED APPLICATION

The present application claims priority of Korean Patent Application Number 10-2013-0128660 filed on Oct. 28, 2013, the entire contents of which application are incorporated herein for all purposes by this reference.

BACKGROUND OF INVENTION

Field of Invention

The present invention relates to a power transmission system of a hybrid electric vehicle. More particularly, the present invention relates to a power transmission system of a hybrid electric vehicle which secures power delivery efficiency by combining an engine and two motor/generators in a hybrid electric vehicle and a plug-in hybrid electric vehicle.

Description of Related Art

Environmentally-friendly technique of vehicles is very important technique on which survival of future motor industry is dependent. Vehicle makers are focusing on development of environmentally-friendly vehicles so as to meet environment and fuel consumption regulations. Therefore, each vehicle maker is developing an electric vehicle (EV), a hybrid electric vehicle (HEV), a fuel cell electric vehicle (FCEV) and so on as future vehicles.

Since the future vehicles have various technical limitations such as weight and cost, the vehicle makers are paying attention to a hybrid electric vehicle in order to meet exhaust gas regulations and improve fuel economy and compete for commercializing the hybrid electric vehicle.

The hybrid electric vehicle is a vehicle using two or more power sources, and a gasoline engine or a diesel engine using fossil fuel and a motor/generator driven by electrical energy are used as the power sources of the hybrid electric vehicle.

The hybrid electric vehicle uses the motor/generator having relatively better low-speed torque characteristics as a main power source at a low-speed and uses an engine having relatively better high-speed torque characteristics as a main power source at a high-speed.

Since the hybrid electric vehicle stops operation of the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the single-mode type.

Since the multi-mode type has high efficiency at the high-speed region and is able to multiply torque autonomously, the multi-mode type can be applied to a full size vehicle. Therefore, the multi-mode type instead of the single-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear sets, and a battery used as a power source of the motor/generators.

The power transmission system of the multi-mode type has different operating mechanisms depend on connections of the planetary gear sets, the motor/generators, and the torque delivery apparatus.

In addition, the power transmission system of the multi-mode type has different features such a durability, power delivery efficiency, and size depend on the connections of the planetary gear sets, the motor/generators, and the torque delivery apparatus. Therefore, designs for the connection structure of the power transmission system of a hybrid electric vehicle are also under continuous investigation to achieve robust and compact power transmission system having no power loss.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a power transmission system of a hybrid electric vehicle having advantages of minimizing unnecessary mechanical loss and securing power delivery efficiency by propelling the vehicle using a motor/generator when an engine is stopped.

In addition, the present invention has been made in an effort to provide a power transmission system of a hybrid electric vehicle having further advantages of improving generating efficiency by connecting an engine and a first motor/generator to one planetary gear set and of maximizing generating efficiency due to regenerative braking by cutting off the engine from an output side of the power transmission system by an engine clutch at regenerative braking.

A power transmission system of a hybrid electric vehicle according to various aspects of the present invention may use an engine and first and second motor/generators as power sources.

In one aspect, the power transmission system may include: a first input device receiving either or both of torques of the engine and the first motor/generator; a torque transmitting device disposed at a rear or downstream of the first input device and selectively receiving torque from the first input device; a second input device disposed at a rear or downstream of the torque transmitting device, converting torque of the second motor/generator, and outputting the converted torque; an output device receiving torque from the torque transmitting device and/or the second input device and outputting the torque; and a final reduction device outputting the torque transmitted from the output device as driving torque.

The first input device may include: a first input shaft receiving the torque of the engine; and a first planetary gear set disposed on the first input shaft and connected to the first motor/generator so as to transmit the torque of the first motor/generator to the first input shaft. A torsional damper for absorbing and reducing torsional vibration may be disposed between the engine and the first input shaft.

In one aspect, the first planetary gear set may be a single pinion planetary gear set and may include a first sun gear directly connected to the first input shaft, a first planet carrier directly connected to the first motor/generator, and a first ring gear fixed to a transmission housing. In another aspect, the first planetary gear set may be a double pinion planetary gear set and may include a first sun gear directly connected to the first input shaft, a first ring gear directly connected to the first motor/generator, and a first planet carrier fixed to a transmission housing.

The torque transmitting device may include: a second input shaft disposed at a rear or downstream of the first input shaft and selectively receiving torque from the first input shaft; a clutch selectively connecting the first input shaft with the second input shaft; and a first input gear disposed on the second input shaft.

The second input device may include: a third input shaft disposed at a rear or downstream of the second input shaft without rotational interference with the second input shaft; a second planetary gear set disposed on the third input shaft and connected to the second motor/generator so as to transmit torque of the second motor/generator to the third input shaft; and a second input gear disposed on the third input shaft.

In an aspect, the second planetary gear set may be a single pinion planetary gear set and may include a second sun gear directly connected to the second motor/generator, a second planet carrier directly connected to the third input shaft, and a second ring gear fixed to a transmission housing. In another aspect, the second planetary gear set may be a double pinion planetary gear set and may include a second sun gear directly connected to the second motor/generator, a second ring gear directly connected to the third input shaft, and a second planet carrier fixed to a transmission housing.

The output device may include: an output shaft disposed in parallel with the second input shaft; a first speed gear disposed on the output shaft and engaged with the first input gear; a second speed gear disposed on the output shaft and engaged with the second input gear; and an output gear disposed on the output shaft and operably connected to the final reduction device so as to transmit torque of the output shaft to the final reduction device.

The final reduction device may include a differential apparatus and a final reduction gear, wherein the final reduction gear is engaged to the output gear so as to output the torque of the output shaft through the differential apparatus.

In various other aspects of the present invention, the power transmission system may include: a first input device including a first input shaft receiving torque of the engine and a first planetary gear set disposed on the first input shaft and connected to the first motor/generator so as to transmit torque of the first motor/generator to the first input shaft; a torque transmitting device including a second input shaft disposed at a rear or downstream of the first input shaft, a clutch selectively connecting the first input shaft with the second input shaft, and a first input gear disposed on the second input shaft; a second input device including a third input shaft dispose at a rear or downstream of the second input shaft without rotational interference with the second input shaft, a second planetary gear set disposed on the third input shaft and connected to the second motor/generator so as to transmit torque of the second motor/generator to the third input shaft, and a second input gear disposed on the third input shaft; an output device including an output shaft disposed in parallel with the second input shaft, a first speed gear disposed on the output shaft and engaged with the first input gear, a second speed gear disposed on the output shaft and engaged with the second input gear, and an output gear disposed on the output shaft; and a final reduction device including a final reduction gear engaged with the output gear and a differential apparatus receiving torque of the output shaft through the final reduction gear.

A torsional damper for absorbing and reducing torsional vibration may be disposed between the engine and the first input shaft.

In one aspect, the first planetary gear set may be a single pinion planetary gear set and may include a first sun gear directly connected to the first input shaft, a first planet carrier directly connected to the first motor/generator, and a first ring gear fixed to a transmission housing. In another aspect, the first planetary gear set may be a double pinion planetary gear set and may include a first sun gear directly connected to the first input shaft, a first ring gear directly connected to the first motor/generator, and a first planet carrier fixed to a transmission housing.

In an aspect, the second planetary gear set may be a single pinion planetary gear set and may include a second sun gear directly connected to the second motor/generator, a second planet carrier directly connected to the third input shaft, and a second ring gear fixed to a transmission housing. In another aspect, the second planetary gear set may be a double pinion planetary gear set and may include a second sun gear directly connected to the second motor/generator, a second ring gear directly connected to the third input shaft, and a second planet carrier fixed to a transmission housing.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
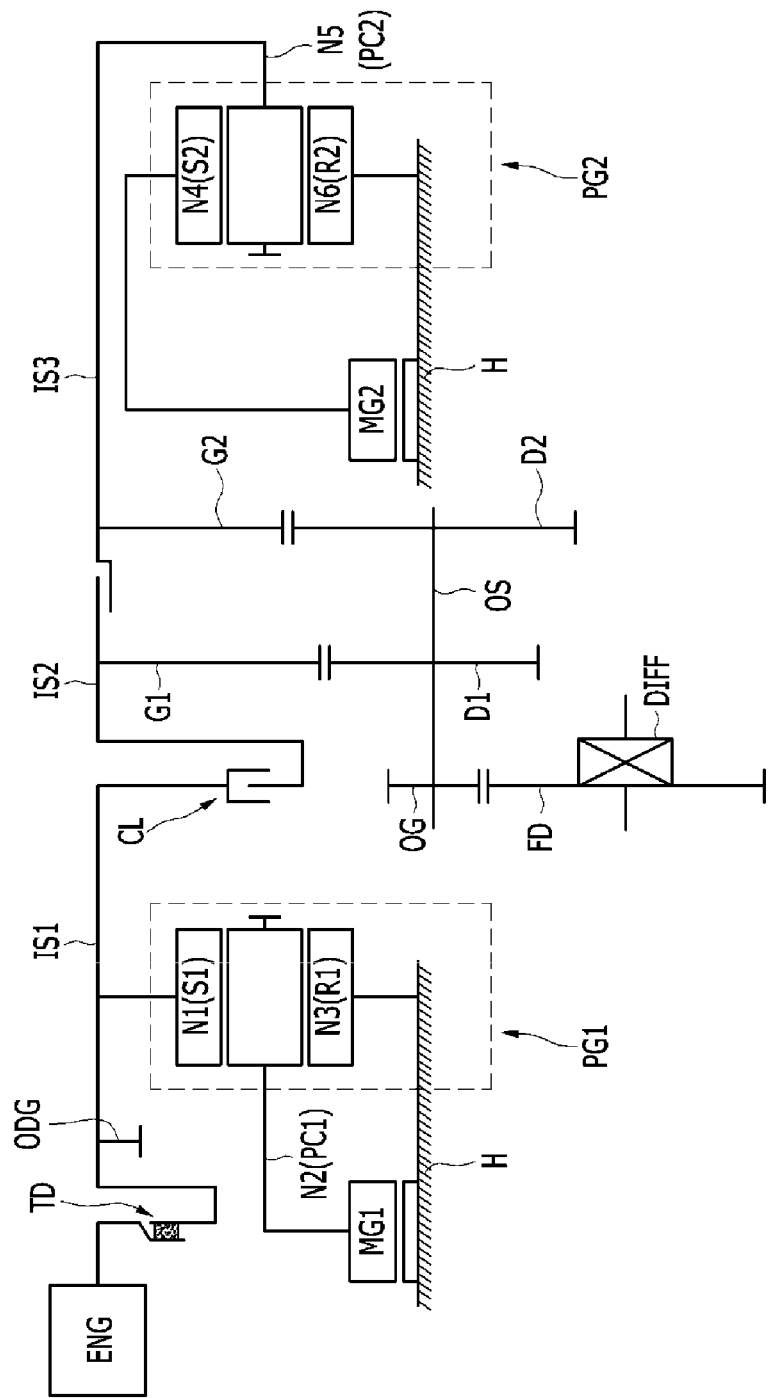
FIG. 1 is a schematic diagram of a first exemplary power transmission system according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the present exemplary embodiment will be omitted, and the same constituent elements are denoted by the same reference numerals in this specification. In the detailed description, ordinal numbers are used for distinguishing constituent elements having the same terms, and have no specific meanings.

FIG. 1 is a schematic diagram of a power transmission system according to the first exemplary embodiment of the present invention. Referring to FIG. 1, a power transmission system of a hybrid electric vehicle according to the first exemplary embodiment of the present invention uses an engine ENG and first and second motor/generators MG1 and MG2 as power sources. The power transmission system includes a first input device, a torque transmitting device, a second input device, an output device, and a final reduction device.

A gasoline engine or a diesel engine using fossil fuel may be used as the engine ENG.

The first input device includes a first input shaft IS1 receiving either or both of torques of the engine ENG and the first motor/generator MG1 and a first planetary gear set PG1 disposed on the first input shaft IS1 and having at least one rotation element connected to the first motor/generator MG1.

Herein, a torsional damper TD for absorbing and reducing torsional vibration and a hydraulic pump driving gear ODG for driving a hydraulic pump are disposed between the first input shaft IS1 and an output side of the engine ENG.

The first planetary gear set PG1 is a single pinion planetary gear set and includes three rotation elements. A first rotation element N1 being a first sun gear S1 is directly connected to the first input shaft IS1, a second rotation element N2 being a first planet carrier PC1 is directly connected to the first motor/generator MG1, a third rotation element N3 being a first ring gear R1 is fixed to a transmission housing H.

Therefore, the torque of the engine ENG is transmitted to the torque transmitting device without changing of rotation speed and is input to the first motor/generator MG1 after the rotation speed is decreased.

The first motor/generator MG1 is operated as a motor and a generator and includes a first rotor and a first stator. That is, the first rotor is connected to the second rotation element N2 and the first stator is fixed to the transmission housing H such that the first motor/generator MG1 is operated as the motor driving the second rotation element N2 or the generator generating electric energy by torque of the second rotation element N2.

The torque transmitting device is dispose at a rear or downstream of the first input device. The torque transmitting device includes a second input shaft IS2 selectively receiving torque from the first input shaft IS1 and a first input gear G1 disposed on the second input shaft IS2.

In addition, a clutch CL is disposed between the first input shaft IS 1 and the second input shaft IS2. The clutch CL selectively transmits the torques of the engine ENG and/or the first motor/generator MG1 to the second input shaft IS2. The clutch CL may be a conventional multi-plate friction element of wet type that is operated by hydraulic pressure and may be controlled by a hydraulic control system.

The second input device is disposed at a rear or downstream of the torque transmitting device. The second input device includes a third input shaft IS3 disposed without rotational interference with the second input shaft IS2, a second planetary gear set PG2 disposed on the third input shaft IS3 and having at least one rotation element connected to the second motor/generator MG2, and a second input gear G2 disposed on the third input shaft IS3.

The second planetary gear set PG2 is a single pinion planetary gear set and includes three rotation elements. A fourth rotation element N4 being a second sun gear S2 is directly connected to the second motor/generator MG2, a fifth rotation element N5 being a second planet carrier PC2 is directly connected to the third input shaft IS3, and a sixth rotation element N6 being a second ring gear R2 is fixed to the transmission housing H.

Therefore, the torque of the second motor/generator MG2 is decelerated by the second planetary gear set PG2 and the decelerated torque is transmitted to the third input shaft IS3.

The second motor/generator MG2 is operated as a motor and a generator and includes a second rotor and a second stator. That is, the second rotor is connected to the fourth rotation element N4 and the second stator is fixed to the transmission housing H such that the second motor/generator MG2 is operated as the motor driving the fourth rotation element N4 or as the generator generating electric energy by torque of the fourth rotation element N4.

In addition, the output device includes an output shaft OS disposed in parallel or substantially in parallel with the second input shaft IS2, a first speed gear D1 disposed on a middle portion of the output shaft OS and engaged with the first input gear G1, a second speed gear D2 disposed on one side portion of the output shaft OS and engaged with the second input gear G2, and an output gear OG disposed on the other side portion of the output shaft OS.

In addition, the final reduction device includes a differential apparatus DIFF and a final reduction gear FD. The final reduction gear FD is engaged with the output gear OG, decelerates torque transmitted from the output shaft OS, and transmits the decelerated torque to a driving wheel through the differential apparatus DIFF.

Operation of the power transmission system according to the first exemplary embodiment of the present invention at each mode will be described in detail.

The clutch CL is not operated at an electric vehicle (EV) mode. Therefore, the engine ENG is stopped and the vehicle is propelled by the second motor/generator MG2. Therefore, high fuel economy may be secured at low speed driving.

If the first motor/generator MG1 starts the engine ENG and the clutch CL is operated at this state, a hybrid electric vehicle (HEV) mode is achieved. The vehicle is propelled by the torque of the engine ENG and the torque of the second motor/generator MG2 at the HEV mode.

At this time, the first motor/generator MG1 can generate electric energy using the torque of the engine ENG and the generated electrical energy is supplied to the second motor/generator MG2 as energy source or is used to charge a battery. In addition if high power is necessary at the HEV mode, the first motor/generator MG1 may be used as an auxiliary power source.

Figure 2:
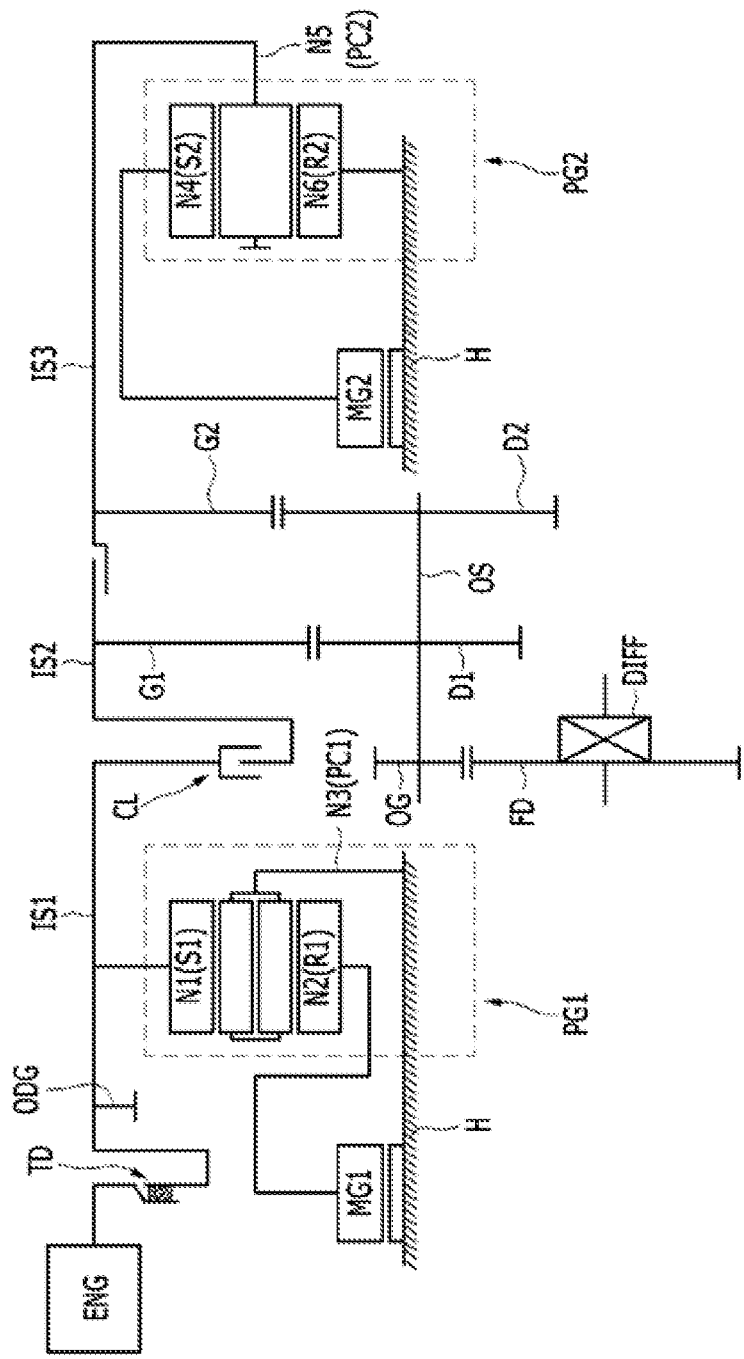
FIG. 2 is a schematic diagram of a second exemplary power transmission system according to the present invention.

FIG. 2 is a schematic diagram of a power transmission system according to the second exemplary embodiment of the present invention. Referring to FIG. 2, the first planetary gear set PG1 is a single pinion planetary gear set in the first exemplary embodiment, but the first planetary gear set PG1 is a double pinion planetary gear set in the second exemplary embodiment.

Therefore, the first rotation element N1 is the first sun gear S1, the second rotation element N2 is the first ring gear R1, and the third rotation element N3 is the first planet carrier PC1. That is, constituent elements and functions of the second exemplary embodiment are the same as those of the first exemplary embodiment except constituent elements related to the second and third rotation elements N2 and N3, detailed description thereof will be omitted.

Figure 3:
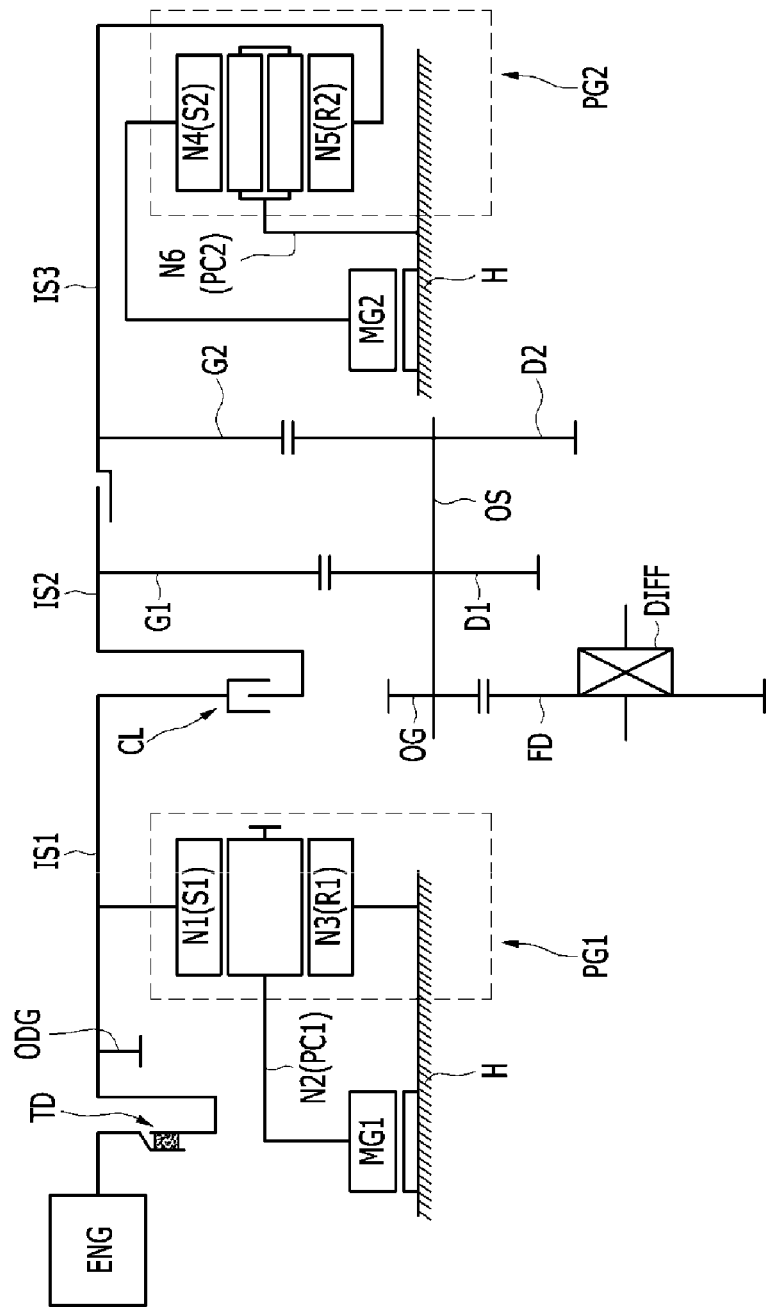
FIG. 3 is a schematic diagram of a third exemplary power transmission system according to the present invention.

FIG. 3 is a schematic diagram of a power transmission system according to the third exemplary embodiment of the present invention. Referring to FIG. 3, the second planetary gear set PG2 is a single pinion planetary gear set in the first exemplary embodiment, but the second planetary gear set PG2 is a double pinion planetary gear set in the third exemplary embodiment.

Therefore, the fourth rotation element N4 is the second sun gear S2, the fifth rotation element N5 is the second ring gear R2, and the sixth rotation element N6 is the second planet carrier PC2. That is, constituent elements and functions of the third exemplary embodiment are the same as those of the first exemplary embodiment except constituent elements related to the fifth and sixth rotation elements N5 and N6, detailed description thereof will be omitted.

Figure 4:
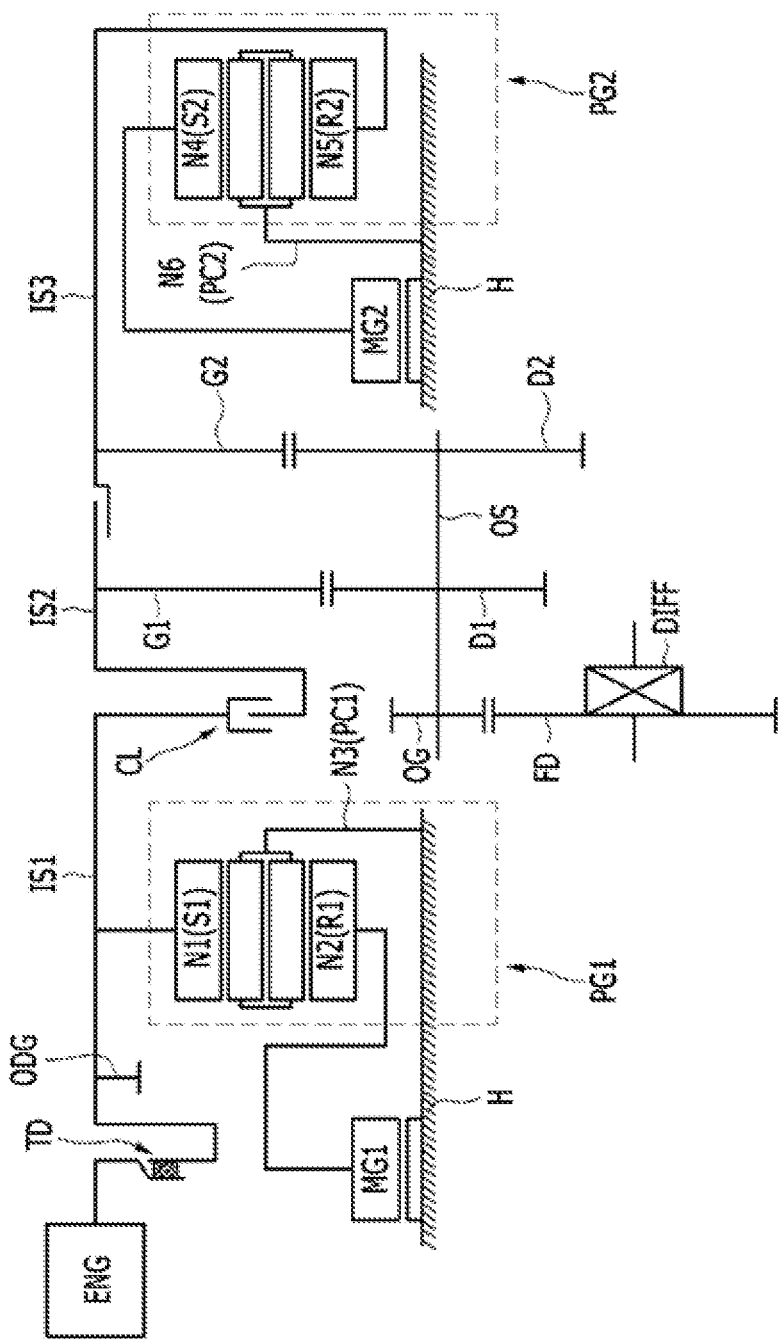
FIG. 4 is a schematic diagram of a fourth exemplary power transmission system according to the present invention.

FIG. 4 is a schematic diagram of a power transmission system according to the fourth exemplary embodiment of the present invention. Referring to FIG. 4, the first and second planetary gear sets PG1 and PG2 are single pinion planetary gear sets in the first exemplary embodiment, but the first and second planetary gear sets PG1 and PG2 are double pinion planetary gear sets in the fourth exemplary embodiment.

Therefore, the first rotation element N1 is the first sun gear S1, the second rotation element N2 is the first ring gear R1, the third rotation element N3 is the first planet carrier PC1, the fourth rotation element N4 is the second sun gear S2, the fifth rotation element N5 is the second ring gear R2, and the sixth rotation element N6 is the second planet carrier PC2. That is, constituent elements and functions of the fourth exemplary embodiment are the same as those of the first exemplary embodiment except constituent elements related to the second, third, fifth, and sixth rotation elements N2, N3, N5, and N6, detailed description thereof will be omitted.

Since the vehicle is driven by the second motor/generator at the EV mode in a stopped state of the engine according to various exemplary embodiments of the present invention, unnecessary mechanical loss may be minimized and power delivery efficiency similar to what the reducer can achieve may be secured.

In addition, generating efficiency may be improved by connecting the engine and the first motor/generator to the first planetary gear set, and generating efficiency may be maximized by cutting off the engine from an output side of the power transmission system by an engine clutch at regenerative braking.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system of a hybrid electric vehicle which uses an engine and first and second motor/generators as power sources, the power transmission system comprising:
    a first input device receiving at least one torque of the engine and the first motor/generator, wherein the first input device comprises:
        a first input shaft receiving the torque of the engine; and
        a first planetary gear set disposed on the first input shaft and connected to the first motor/generator so as to transmit the torque of the first motor/generator to the first input shaft, and
        wherein the first planetary gear set is a single pinion planetary gear set and includes a first sun gear directly connected to the first input shaft, a first planet carrier directly connected to the first motor/generator, and a first ring gear fixed to a transmission housing;
    a torque transmitting shaft disposed at a rear or downstream of the first input device and selectively receiving torque from the first input device;
    a second input shaft disposed at a rear or downstream of the torque transmitting shaft, converting torque of the second motor/generator, and outputting the converted torque;
    an output shaft receiving torque from at least one of the torque transmitting shaft and the second input shaft and outputting the torque; and
    a final reduction gearing outputting the torque transmitted from the output shaft as driving torque.

2. The power transmission system of claim 1, wherein a torsional damper for absorbing and reducing torsional vibration is disposed between the engine and the first input shaft.

3. The power transmission system of claim 1, wherein the first planetary gear set is a double pinion planetary gear set and includes a first sun gear directly connected to the first input shaft, a first ring gear directly connected to the first motor/generator, and a first planet carrier fixed to a transmission housing.

4. A power transmission system of a hybrid electric vehicle which uses an engine and first and second motor/generators as power sources, the power transmission system comprising:
    a first input device receiving at least one torque of the engine and the first motor/generator, wherein the first input device comprises:
        a first input shaft receiving the torque of the engine; and
        a first planetary gear set disposed on the first input shaft and connected to the first motor/generator so as to transmit the torque of the first motor/generator to the first input shaft;
    a torque transmitting device disposed at a rear or downstream of the first input device and selectively receiving torque from the first input device, wherein the torque transmitting device comprises:
        a second input shaft disposed at a rear or downstream of the first input shaft and selectively receiving torque from the first input shaft, converting torque of the second motor/generator, and outputting the converted torque;
        a clutch selectively connecting the first input shaft with the second input shaft; and
        a first input gear disposed on the second input shaft;
    an output shaft receiving torque from at least one of the torque transmitting device and the second input shaft and outputting the torque; and
    a final reduction gearing outputting the torque transmitted from the output shaft as driving torque.

5. The power transmission system of claim 4, wherein a third input shaft is disposed at a rear or downstream of the second input shaft without rotational interference with the second input shaft;

a second planetary gear set is disposed on the third input shaft and connected to the second motor/generator so as to transmit the torque of the second motor/generator to the third input shaft; and a second input gear is disposed on the third input shaft.

6. The power transmission system of claim 5, wherein the second planetary gear set is a single pinion planetary gear set and includes a second sun gear directly connected to the second motor/generator, a second planet carrier directly connected to the third input shaft, and a second ring gear fixed to a transmission housing.

7. The power transmission system of claim 5, wherein the second planetary gear set is a double pinion planetary gear set and includes a second sun gear directly connected to the second motor/generator, a second ring gear directly connected to the third input shaft, and a second planet carrier fixed to a transmission housing.

8. The power transmission system of claim 5, wherein
the output shaft is disposed in parallel with the second input shaft;
a first speed gear is disposed on the output shaft and engaged with the first input gear;
a second speed gear is disposed on the output shaft and engaged with the second input gear; and
an output gear is disposed on the output shaft and operably connected to the final reduction gearing so as to transmit torque of the output shaft to the final reduction gearing.

9. The power transmission system of claim 8, wherein the final reduction gearing includes a differential apparatus and a final reduction gear, and
wherein the final reduction gear is engaged to the output gear so as to output the torque of the output shaft through the differential apparatus.

10. A power transmission system of a hybrid electric vehicle which uses an engine and first and second motor/generators as power sources, the power transmission system comprising:
a first input device including a first input shaft receiving torque of the engine and a first planetary gear set disposed on the first input shaft and connected to the first motor/generator so as to transmit torque of the first motor/generator to the first input shaft;
a torque transmitting device including a second input shaft disposed at a rear or downstream of the first input shaft, a clutch selectively connecting the first input shaft with the second input shaft, and a first input gear disposed on the second input shaft;
a second input device including a third input shaft disposed at a rear or downstream of the second input shaft without rotational interference with the second input shaft, a second planetary gear set disposed on the third input shaft and connected to the second motor/generator so as to transmit torque of the second motor/generator to the third input shaft, and a second input gear disposed on the third input shaft;
an output device including an output shaft disposed in parallel with the second input shaft, a first speed gear disposed on the output shaft and engaged with the first input gear, a second speed gear disposed on the output shaft and engaged with the second input gear, and an output gear disposed on the output shaft; and
a final reduction device including a final reduction gear engaged with the output gear and a differential apparatus receiving torque of the output shaft through the final reduction gear.

11. The power transmission system of claim 10, wherein a torsional damper for absorbing and reducing torsional vibration is disposed between the engine and the first input shaft.

12. The power transmission system of claim 10, wherein the first planetary gear set is a single pinion planetary gear set and includes a first sun gear directly connected to the first input shaft, a first planet carrier directly connected to the first motor/generator, and a first ring gear fixed to a transmission housing.

13. The power transmission system of claim 10, wherein the first planetary gear set is a double pinion planetary gear set and includes a first sun gear directly connected to the first input shaft, a first ring gear directly connected to the first motor/generator, and a first planet carrier fixed to a transmission housing.

14. The power transmission system of claim 10, wherein the second planetary gear set is a single pinion planetary gear set and includes a second sun gear directly connected to the second motor/generator, a second planet carrier directly connected to the third input shaft, and a second ring gear fixed to a transmission housing.

15. The power transmission system of claim 10, wherein the second planetary gear set is a double pinion planetary gear set and includes a second sun gear directly connected to the second motor/generator, a second ring gear directly connected to the third input shaft, and a second planet carrier fixed to a transmission housing.

* * * * *